United States Patent

Rohrberg et al.

[11] Patent Number: 5,837,968
[45] Date of Patent: Nov. 17, 1998

[54] COMPUTER-CONTROLLED MODULAR POWER SUPPLY FOR PRECISION WELDING

[75] Inventors: Roderick G. Rohrberg; Timothy K. Rohrberg, both of Torrance; Charles E. Nourrcier, Lakewood; Eugene S. Yung, Simi Valley, all of Calif.

[73] Assignee: Creative Pathways, Inc., Torrance, Calif.

[21] Appl. No.: 680,764

[22] Filed: Jul. 15, 1996

[51] Int. Cl.$^6$ ........................................................ B23K 9/10
[52] U.S. Cl. .................................................... 219/130.1
[58] Field of Search ........................... 219/130.1, 130.21, 219/130.31, 130.33, 130.32, 130.5, 130.51, 132, 137 PS

[56] References Cited

U.S. PATENT DOCUMENTS

| | | | |
|---|---|---|---|
| 2,871,440 | 1/1959 | Hart | 219/130.1 |
| 3,177,338 | 4/1965 | Hoffmann | 219/130.1 |
| 3,278,721 | 10/1966 | Roe | 219/130.1 |
| 3,324,379 | 6/1967 | Mulder | 219/130.1 |
| 3,851,141 | 11/1974 | Cooper | 219/132 |
| 4,733,025 | 3/1988 | Buerkel | 219/130.1 |
| 4,804,811 | 2/1989 | Raycher et al. | 219/130.1 |
| 5,406,050 | 4/1995 | Macomber et al. | 219/130.1 |

*Primary Examiner*—Clifford C. Shaw
*Attorney, Agent, or Firm*—Anglin & Giaccherini

[57] ABSTRACT

A Computer Controlled Modular Power Supply for Precision Welding (10) that overcomes the problems encountered by previous power supplies is disclosed. A preferred embodiment of the invention includes an enclosure (100) which holds a Computer Control Module (400), a Welding Power Module (500) and an Electrical Power Module (600). These modules are removable, interchangeable and may be used in any combination. The Computer Control Module (400) includes a microprocessor (406) which is programmed using a color LCD display with a touch screen (300) mounted on one side of the enclosure. In a preferred embodiment of the invention, an 80486 chip is used to run a Microsoft™ Windows™ Operating System and proprietary, user-friendly software developed by Creative Pathways, Inc. of Torrance, Calif. that controls welding operations. The Welding Power Module (500) includes four removable drawers (502) which each contain an individual power unit. The Power Supply is lightweight, portable, and dissipates heat without vents or fans.

18 Claims, 17 Drawing Sheets

Microfiche Appendix Included
(2 Microfiche, 195 Pages)

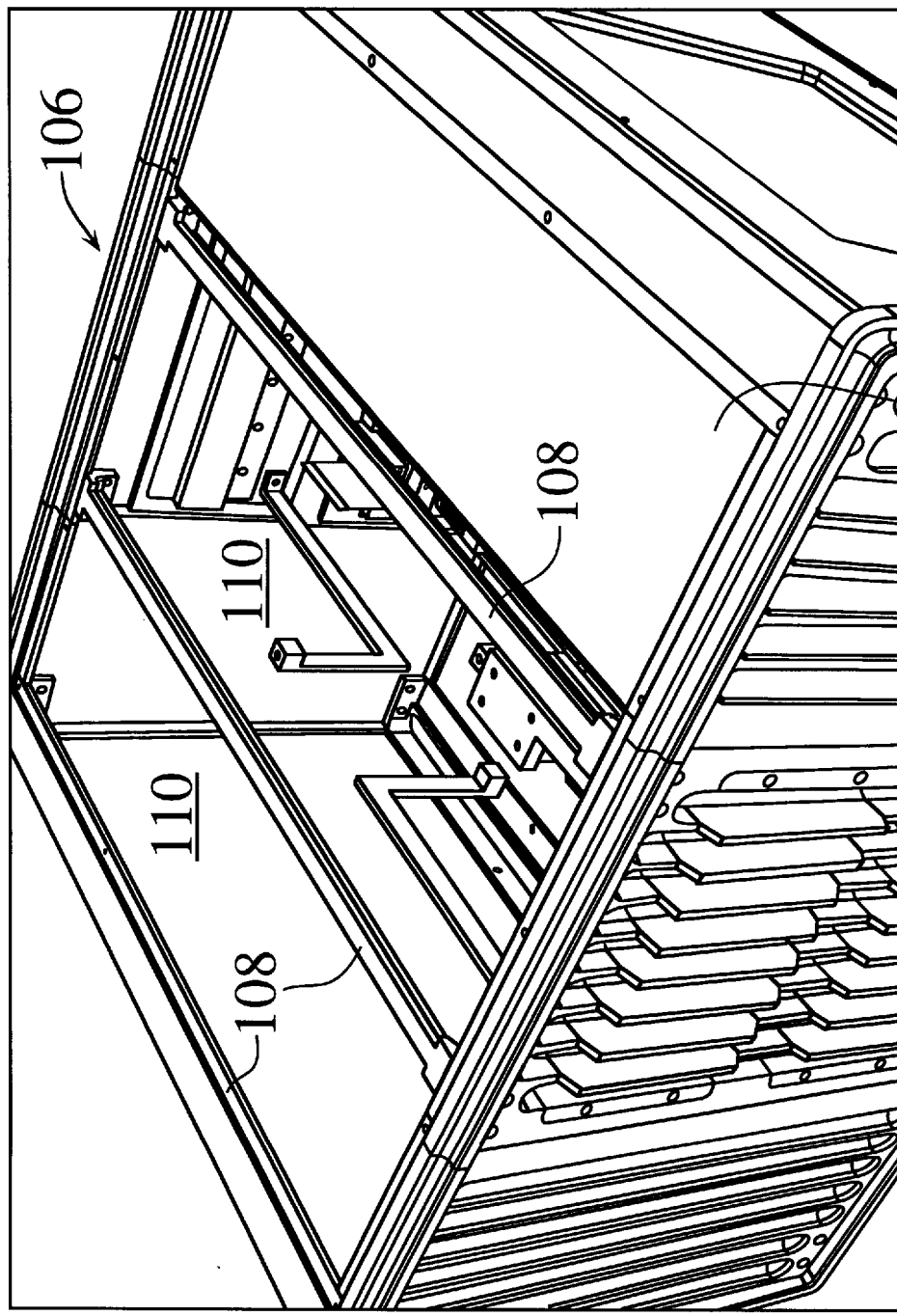

Certification

| | |
|---|---|
| Custom/Program: MyProg | Date: 08-29-1995 |
| Weld Schedule: DEFAULT1 | Quantity: 1 |
| Power Supply: PwrSupp | SN: 1 — 2 |
| Weld Head: WeldHead | Power Supply SN: 123 |
| | Specification: MySpec |

Schedule Name: DEFAULT1

[Welder Parameter] [Fixture Parameter] [Certification]

[View Logs] [Cancel] [Save] [Run Welder]

Electrode Parameters

| | |
|---|---|
| Type | EleType |
| Diameter | 0 |
| Arc Length | 0 |
| Gauge | 0 |

Material Type

| | |
|---|---|
| Tube Alloy | TAlloy |
| Tube Diameter | 0 |
| Tube Wall | 0 |
| Fitting Alloy | TAlloy |
| Fitting Diameter | 0 |
| Fitting Wall | 0 |

Text

| | |
|---|---|
| Program | MyProg |
| Date | 08-29-1995 |
| Schedule | DEFAULT1 |
| Specification | MySpec |
| Developed By | Leon |
| Weld Head | WeldHead |

Schedule Name: DEFAULT1

[Welder Parameter] [Fixture Parameter] [Certification]

[View Logs] [Cancel] [Save] [Run Welder]

COMPUTER-CONTROLLED MODULAR POWER SUPPLY FOR PRECISION WELDING

FIELD OF THE INVENTION

The present invention is a system that provides a programmable and automatic modular power supply for precision welding, induction heating and CNC operations. The system comprises a lightweight, portable sealed enclosure designed for use in a cleanroom environment as well as normal shop and field applications. One preferred embodiment of the enclosure contains three interchangeable modules individually dedicated to microprocessor control, power generation and electronic output. The exterior of the novel housing offers a liquid crystal display which functions with a touch screen, and includes heat sinks built into the side walls to dissipate heat via conduction, radiation and convection. Unlike previous systems which need heat sinks and fans inside the housing, this innovative design eliminates the need for fans or vents and ensures a virtually dust and moisture free environment within the housing. The enclosure acts as the heat sink for the entire Power Supply.

REFERENCE TO MICROFICHE APPENDIX

This Application includes a Microfiche Appendix with 2 frames and 195 page and a hard copy of the Appendix in accordance with the provisions of 37 C.F.R. Section 1.77 (e)(2).

BACKGROUND OF THE INVENTION

Many fabrication processes require equipment that is capable of joining and welding metal or plastic parts. In the aerospace and electronics fields, precision welding tasks may call for joining two parts under extremely exacting circumstances and dimension tolerances. These precision welding operations may need to be replicated over and over again automatically in a cleanroom or in a spacecraft environment with exceptionally high rates of accuracy and reliability.

Several conventional welding systems are currently available in the commercial marketplace. Weldlogic, Inc. of Los Angeles, Calif., sells a Model No. AWS-150 Advanced Welding System. This product is computer controlled and offers closed-loop servo control of weld current, travel speed, arc distance control and wire feed.

MK Products, Inc. of Irvine, Calif. manufactures an MK Orbital Digital Welding Power Source that furnishes automatic control, menu driven software and a dynamic color display.

Previous power supplies have served the needs of the welding industry adequately, but are often limited by several shortcomings. The programming capabilities of currently available power supplies are often difficult to learn and use. The common-place closed and unitary design of previous systems makes it impossible to switch-out or interchange separate sections of the unit for repair. Fans and other well-known cooling mechanisms inject dust, dirt and moisture into the critical electronic components within the power supply housing and cause electrical failures. The extremely large bulk and volume of older power supplies render them an expensive addition to a cleanroom facility where all available space is precious.

The shortcomings of conventional power supplies has presented a major challenge to designers in the welding industry. The development of a miniaturized, lightweight, portable, modular, dust and moisture free system that provides easy-to-use programmable computer control for a wide variety of welding jobs would constitute a major technological advance. The enhanced performance that could be achieved using such an innovative device would satisfy a long felt need within the welding industry.

SUMMARY OF THE INVENTION

The Computer-Controlled Modular Power Supply for Precision Welding which is disclosed and claimed below overcomes the problems encountered by previous power supply equipment. The present invention comprises a sealed contaminant and moisture free enclosure which radiates heat without vents or fans. The portable unit is lightweight and occupies a relatively small footprint compared to other power supplies that are currently on the market. The interior of the enclosure offers a modular configuration which permits the rapid insertion of interchangeable modules. The invention may be used to control welding, induction heating or CNC operations.

In one embodiment of the invention, the Power Supply utilizes a Computer Control Module, a Welding Power Module and an Electrical Power Module. Each of these modules may be removed individually for easy maintenance, repair or replacement. The Computer Control Module includes a micro-processor which is programmed using a touch screen LCD display mounted on one side of the enclosure. In a preferred embodiment of the invention, an 80486 chip is used to run a Microsoft™ Windows™ Operating System and proprietary, user-friendly software developed by Creative Pathways, Inc. of Torrance, Calif. that controls welding operations. In a preferred embodiment, the Welding Power Module comprises four drawers which each contain an independent power unit. The Welding Power Module also includes a low emission arc starter and may operate more than one welding arc simultaneously.

An appreciation of other aims and objectives of the present invention and a more complete and comprehensive understanding of this invention may be achieved by studying the following description of a preferred embodiment and by referring to the accompanying drawings.

BRIEF DESCRIPTION OF THE DRAWINGS

FIGS. 1A, 1B, 1C and 1D are isometric views of a preferred embodiment of the present invention.

Figure 5:
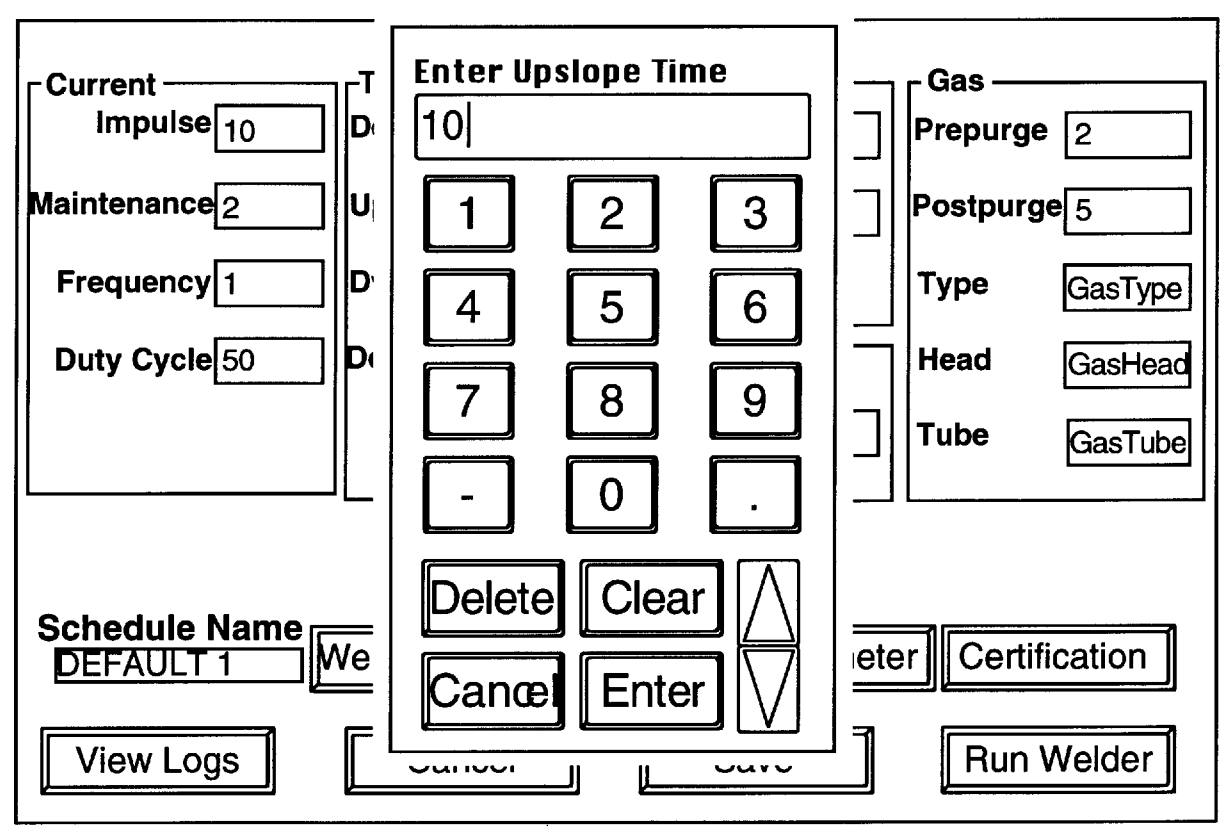
Figure 8:
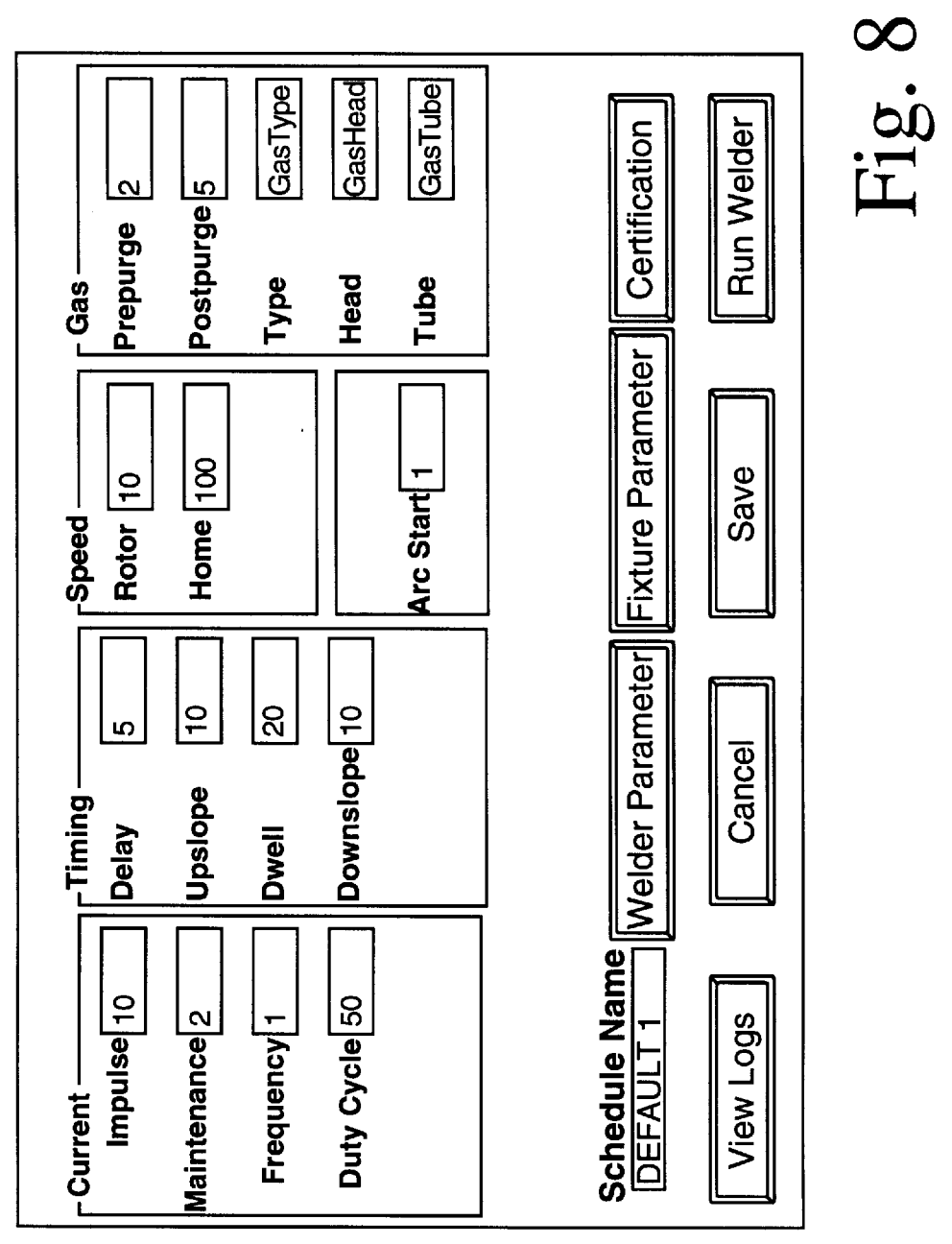

FIGS. 4 through 9 are reproductions of photographs of the output of the display. This sequence of drawings illustrates the easy-to-use computer program which provides precise and automatic control of the present invention.

DETAILED DESCRIPTION OF PREFERRED & ALTERNATIVE EMBODIMENTS

Figure 1A:
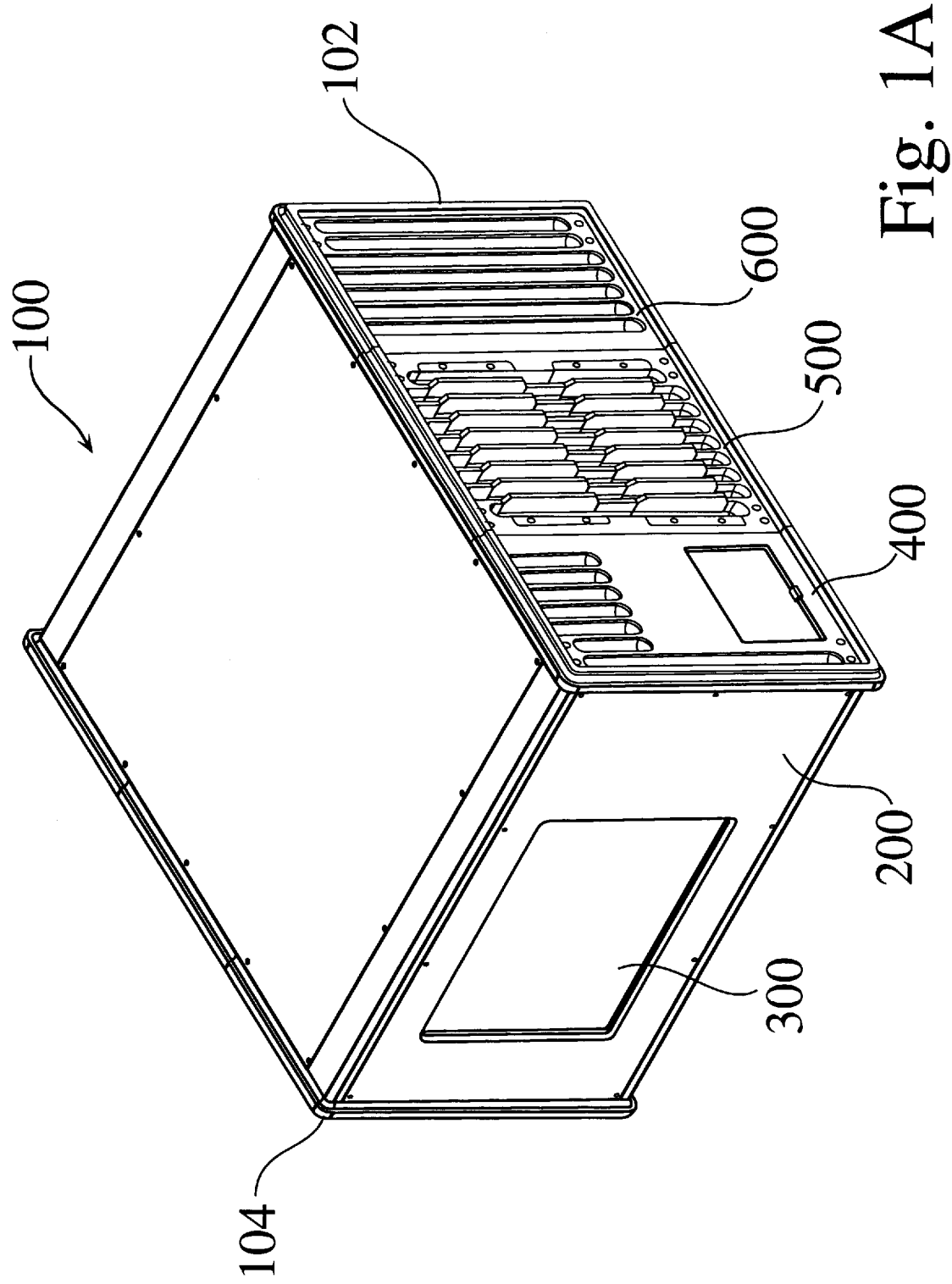

FIG. 1A is an isometric view of a preferred embodiment of the Computer-Controlled Modular Power Supply for Precision Welding. A miniaturized, lightweight and portable aluminum enclosure 100 comprises rectangular frames 102 and 104 which provide support for the panels held within them. Compared to previous power supplies, the present invention represents a substantial improvement in the amount of space and volume that it occupies. Although the embodiment portrayed in FIG. 1A weighs only about forty-five pounds, it is capable of delivering from 25 to 200 amperes of high quality power for welding tasks. The invention may be used to control welding, induction heating an XY-table or CNC operations. When used to control welding tasks, the Power Supply may be used for longitudinal, multi-head and multi-axes procedures. The present invention may operate twin electrodes simultaneously.

Figure 1B:
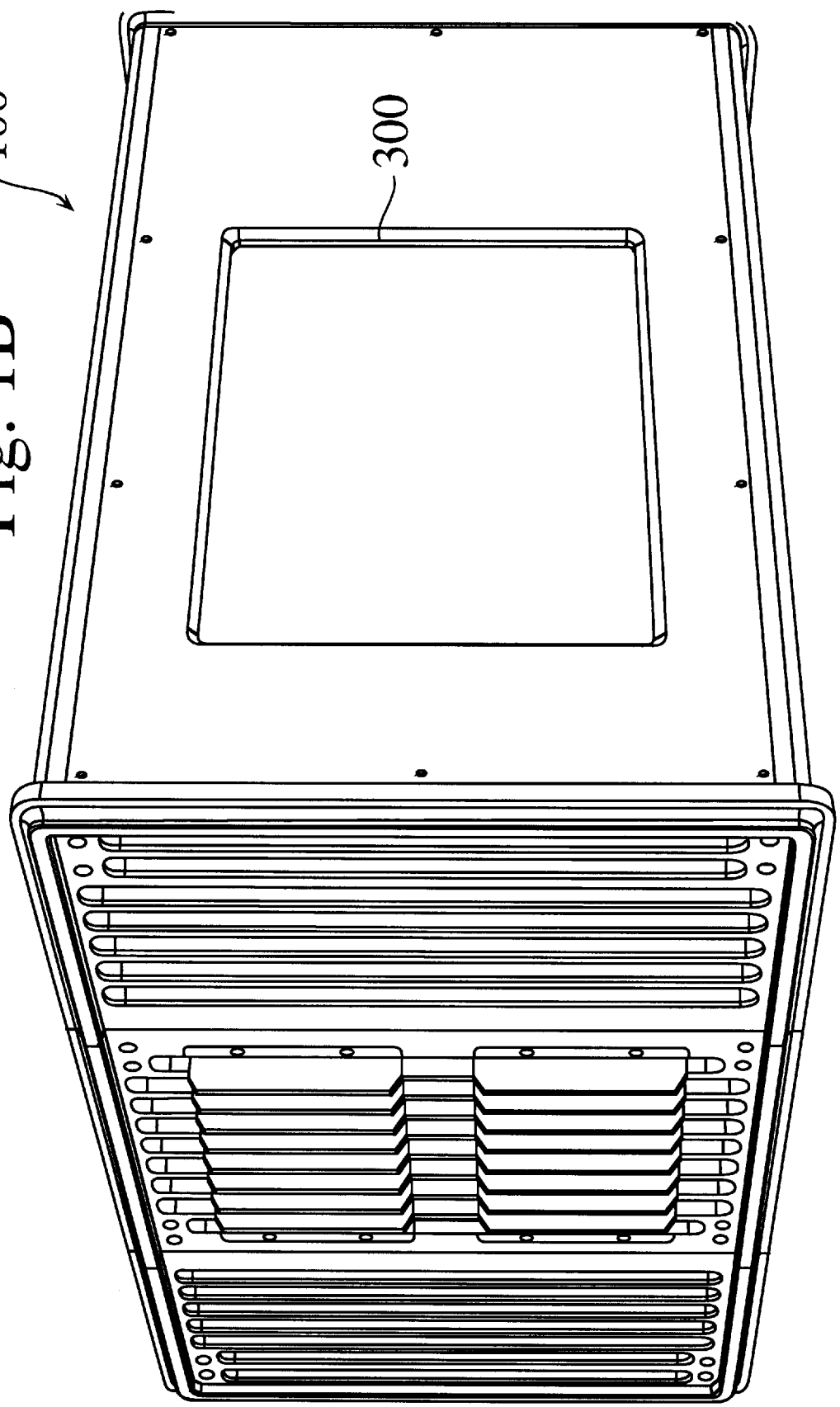
Figure 1D:
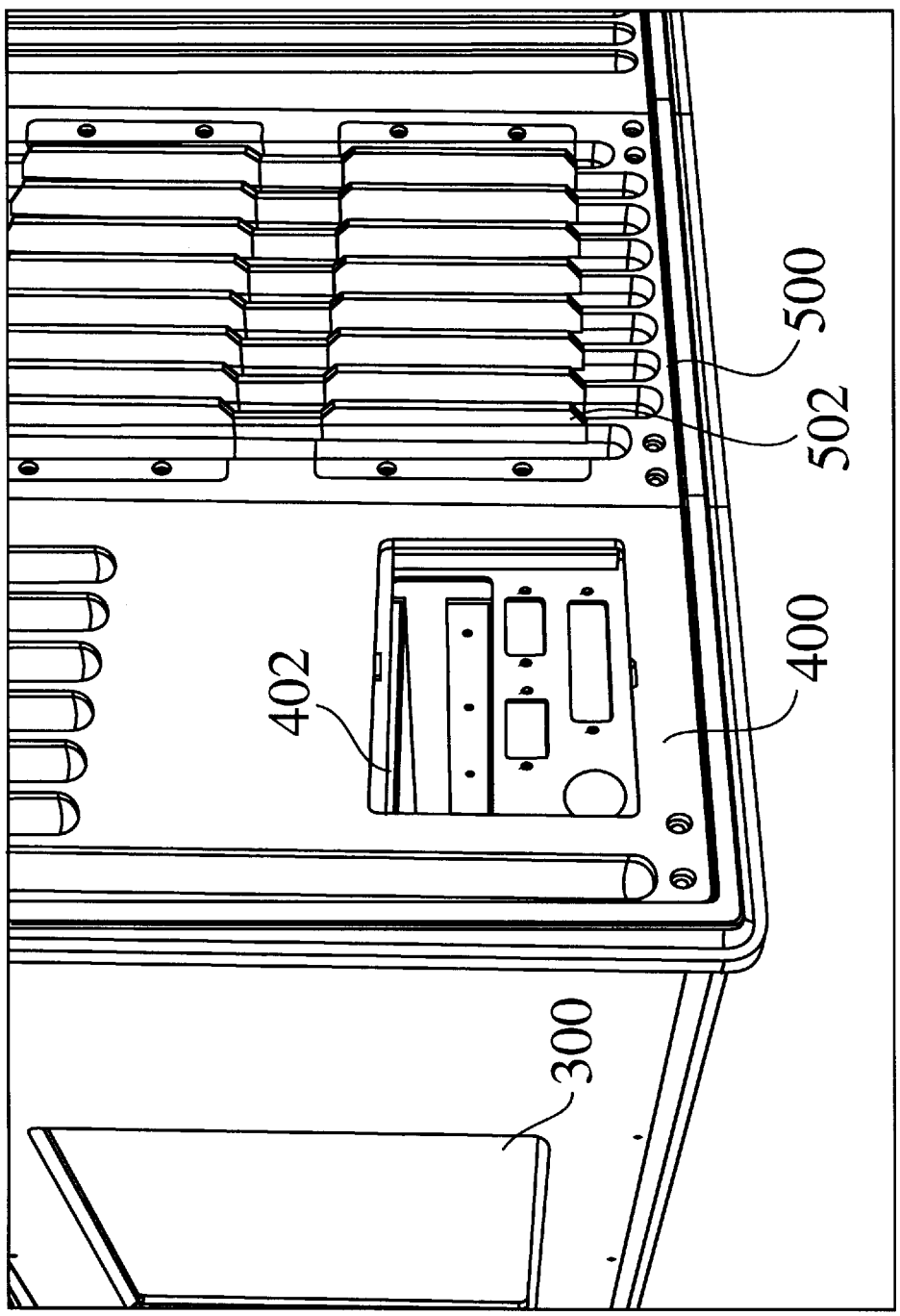
Figure 1E:
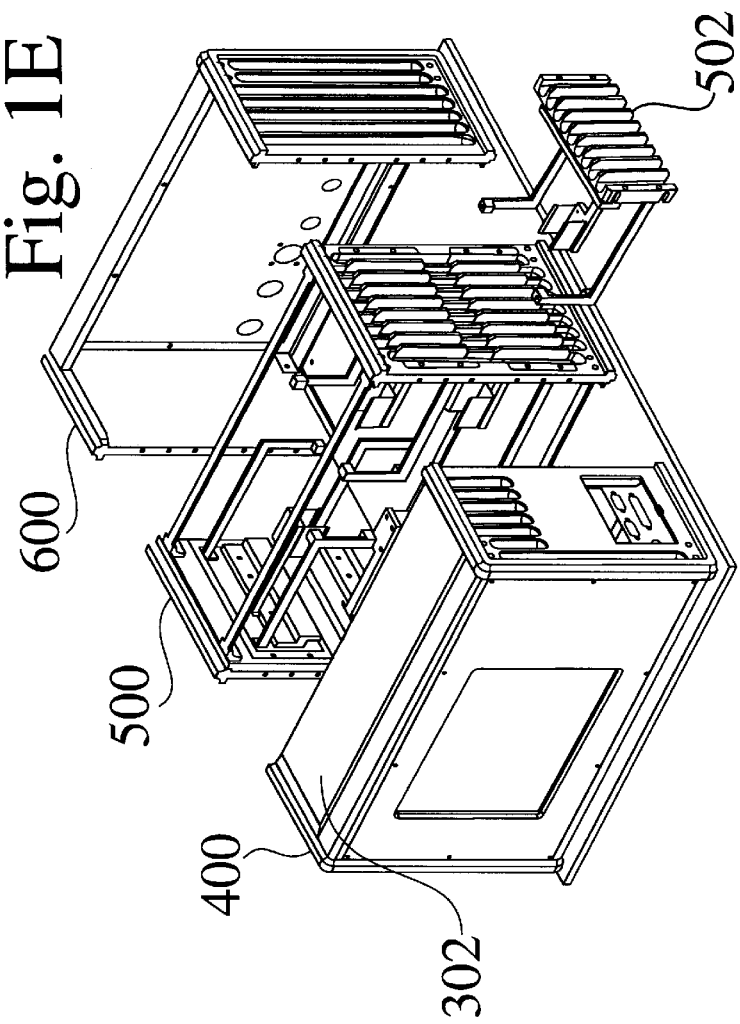
FIGS. 1E through 1I reveal the modular design of the enclosure.
Figure 1H:
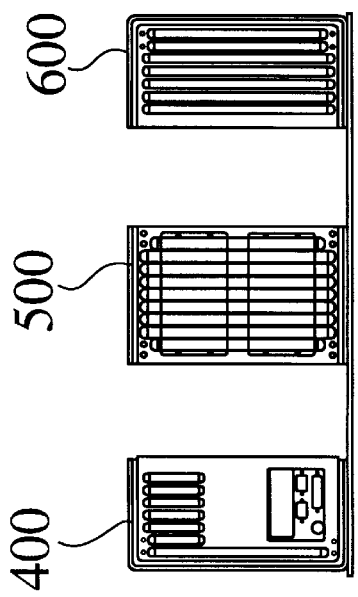
Figure 1F:
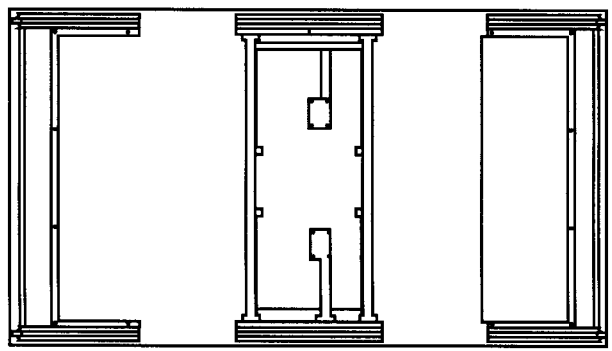
Figure 1G:
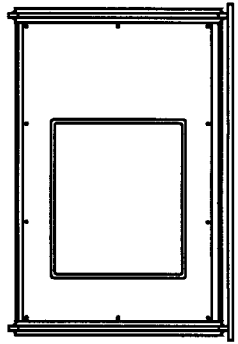
Figure 1I:
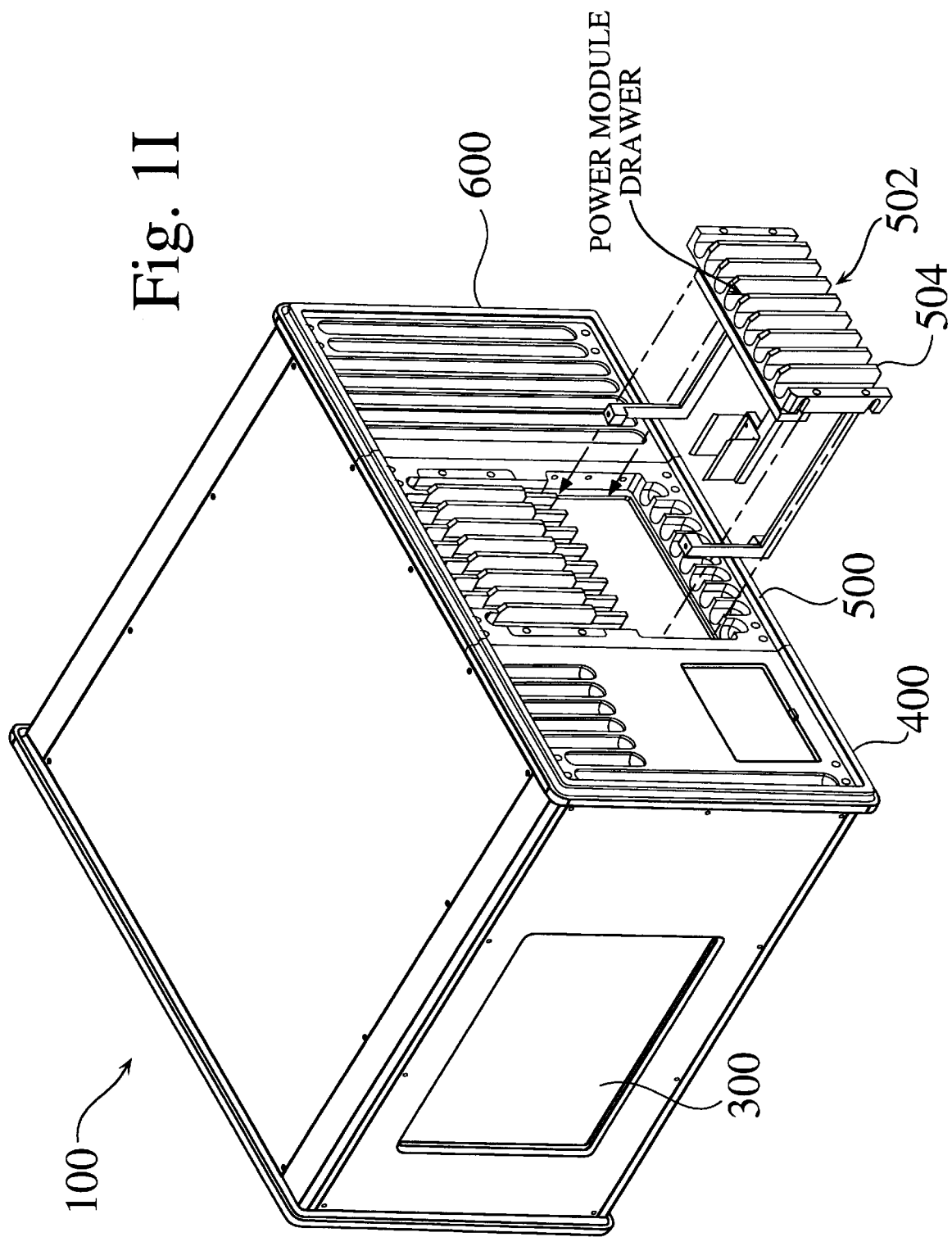

The front panel 200 of the enclosure 100 includes a display with a touch screen 300 that allows the operator of the power supply to control and to monitor its functions. The operation of the power supply may also be monitored remotely using a cathode ray tube display. The embodiment shown in FIG. 1A has three modules: a Computer Control Module 400, a Welding Power Module 500 and an Electrical Power Module 600. A carbon steel enclosure 302 which prevents transients from disturbing the operation of the electronic components within the Module 400 resides inside Computer Control Module 400. FIG. 1B offers another isometric view of the enclosure 100, while FIG. 1C reveals a view of the interior 106. Rails 108 span the enclosure's interior 106 and are capable of receiving a variety of modules 400, 500 & 600 into bays 110 within the enclosure 100. FIG. 1D exhibits the side walls of the Computer Control Module 400 and the Welding Power Module 500. The Computer Control Module 400 includes a computer peripheral panel 402. This panel furnishes external coupling hardware, including PCMCIA and remote display couplers; serial ports for connections to pointing devices, keyboards and modems; and parallel ports for connections to printers.

FIGS. 1E through 1I reveal the modular design of the enclosure. The embodiment depicted in these drawings provide for three modules. Any number or combination of similar or different modules may be inserted into the enclosure. This modular design offers maximum flexibility and versatility to the customer, and is especially valuable when individual parts of the welding power supply need to be maintained, tested, repaired or replaced.

In the preferred embodiment pictured in FIGS. 1E, 1F, 1G, 1H and 1I, the Welding Power Module 500 comprises four drawers 502 which each contain an individual power unit. Although four drawers 502 are depicted in FIGS. 1E, 1F, 1G, 1H and 1I, the invention provides for many alternative configuration of a wide variety of different sized drawers. The outside walls of each of the drawers 502 the Welding Power Module 500 have a number of deep cut heat dissipating fins 504. Unlike previous conventional power supplies which utilize heat sinks and fins located inside the power supply enclosure, the present invention has fins 504 on the exterior of the enclosure 100. Heat produced by each of the drawers 502 is released by both conduction, convection and radiant cooling. These fins 504, which are integrally formed on the drawers 502, help the enclosure 100 to function as a very large heat sink. This innovative feature eliminates the need for cooling fans or vents, which would introduce dust, dirt and moisture into the environment within the enclosure. By keeping the Power Supply free from this contamination, the reliability and performance of the internal electronic components are greatly enhanced.

Figure 2:
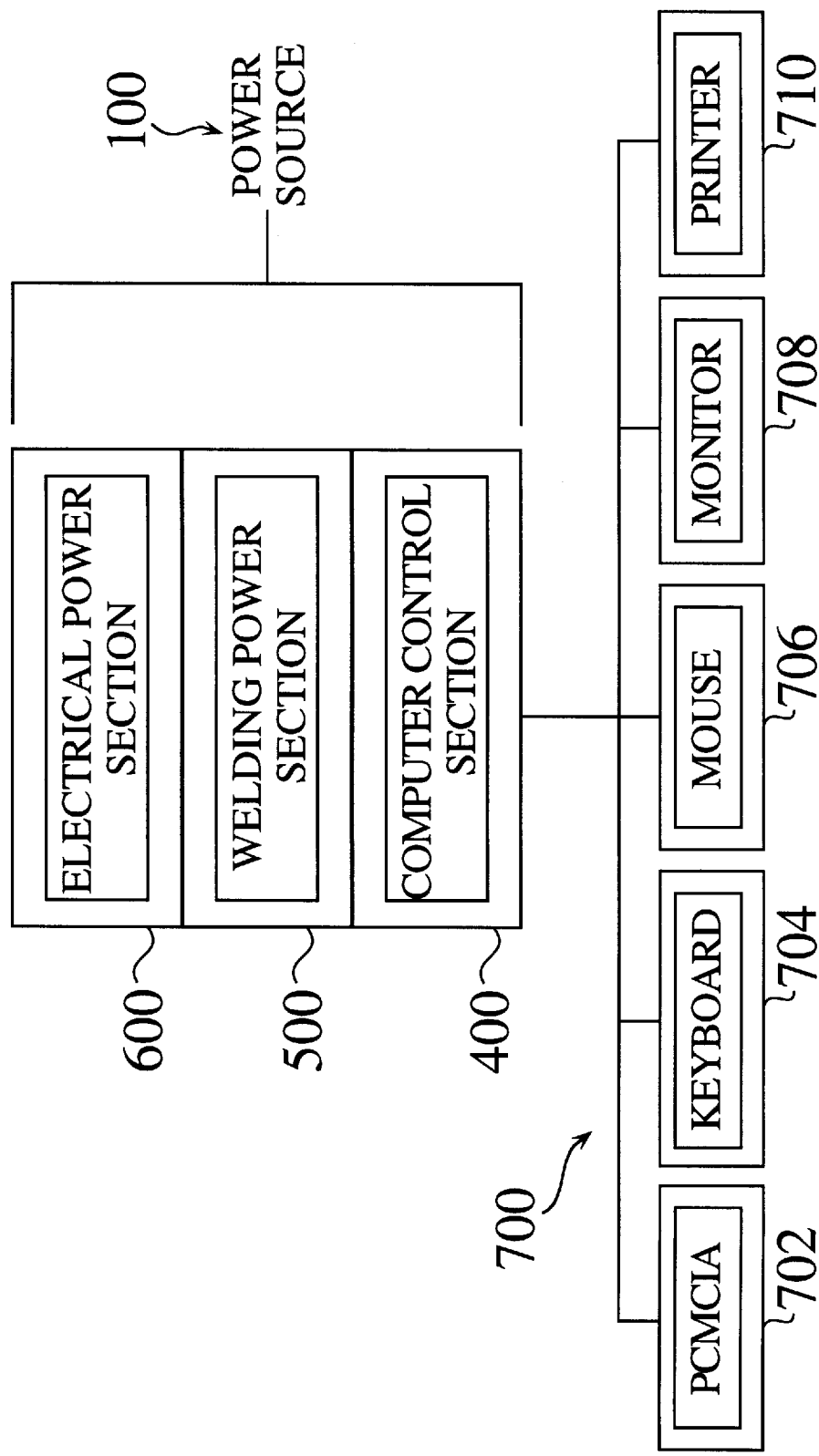
FIG. 2 is a block diagram which portrays the functional capabilities of the present invention and the many possible connections to input, storage and peripheral devices.
Figure 3:
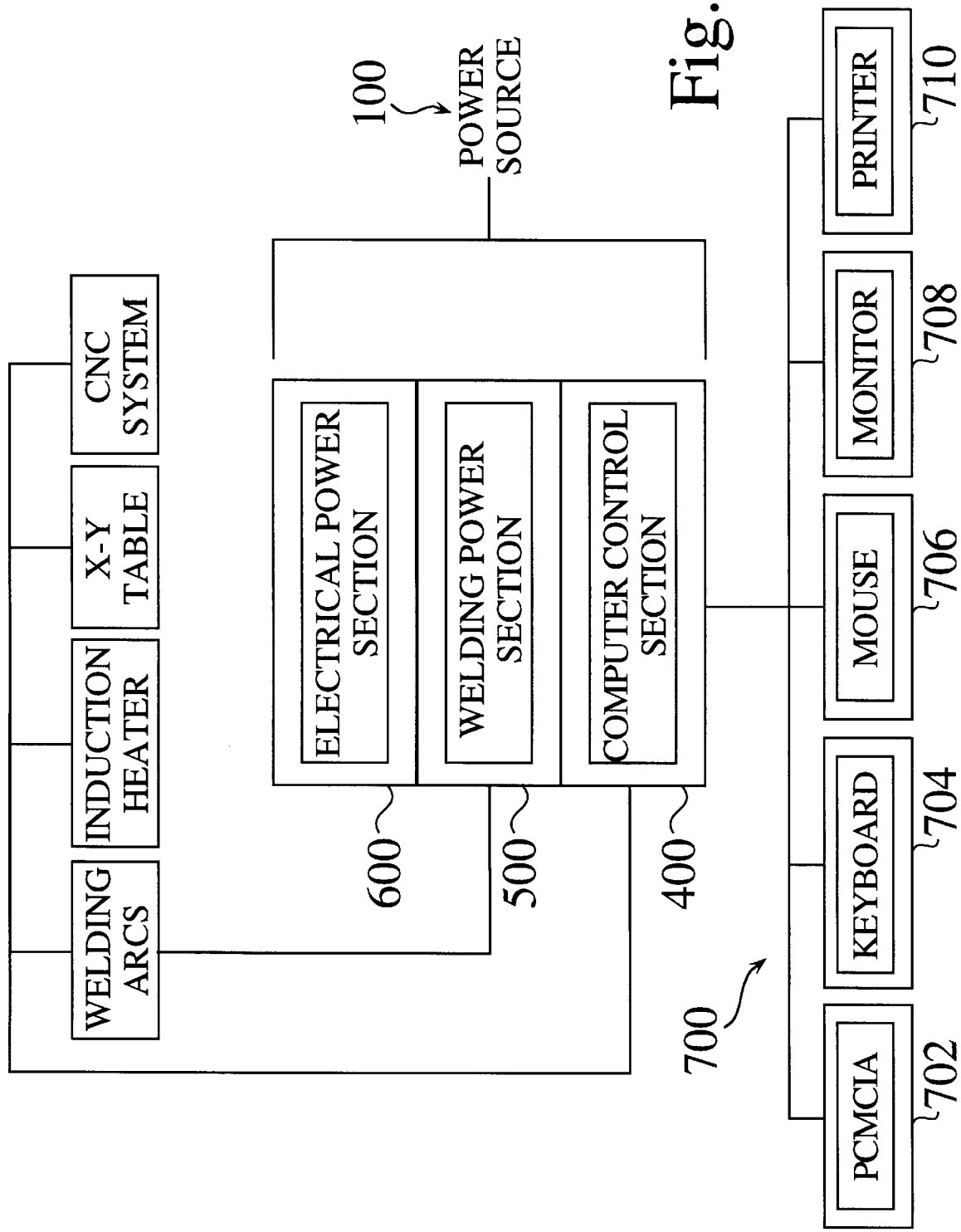
FIG. 3 provides an additional block diagram which shows connections between an embodiment of the present invention and external devices.
Figure 4:
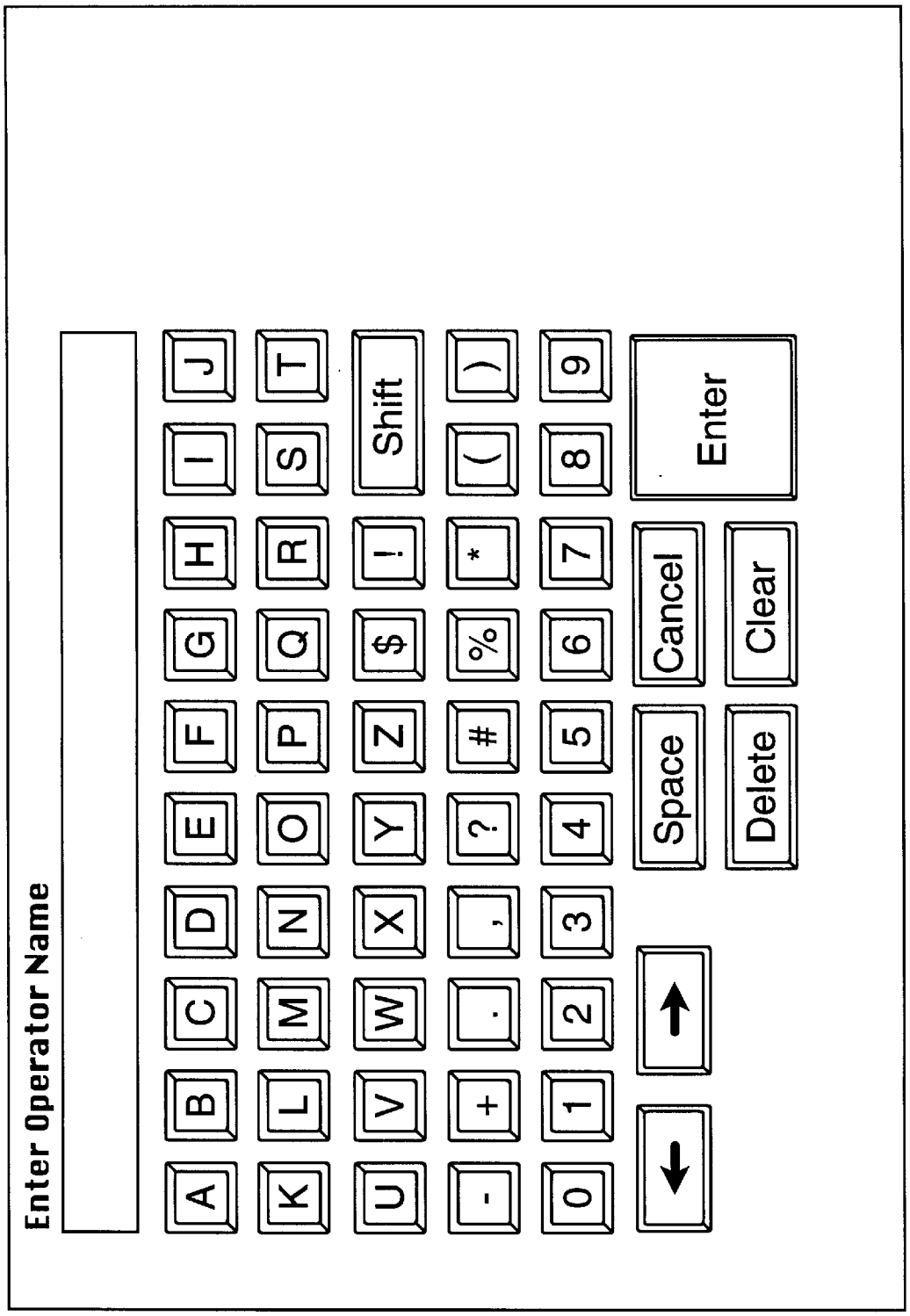
Figure 9:
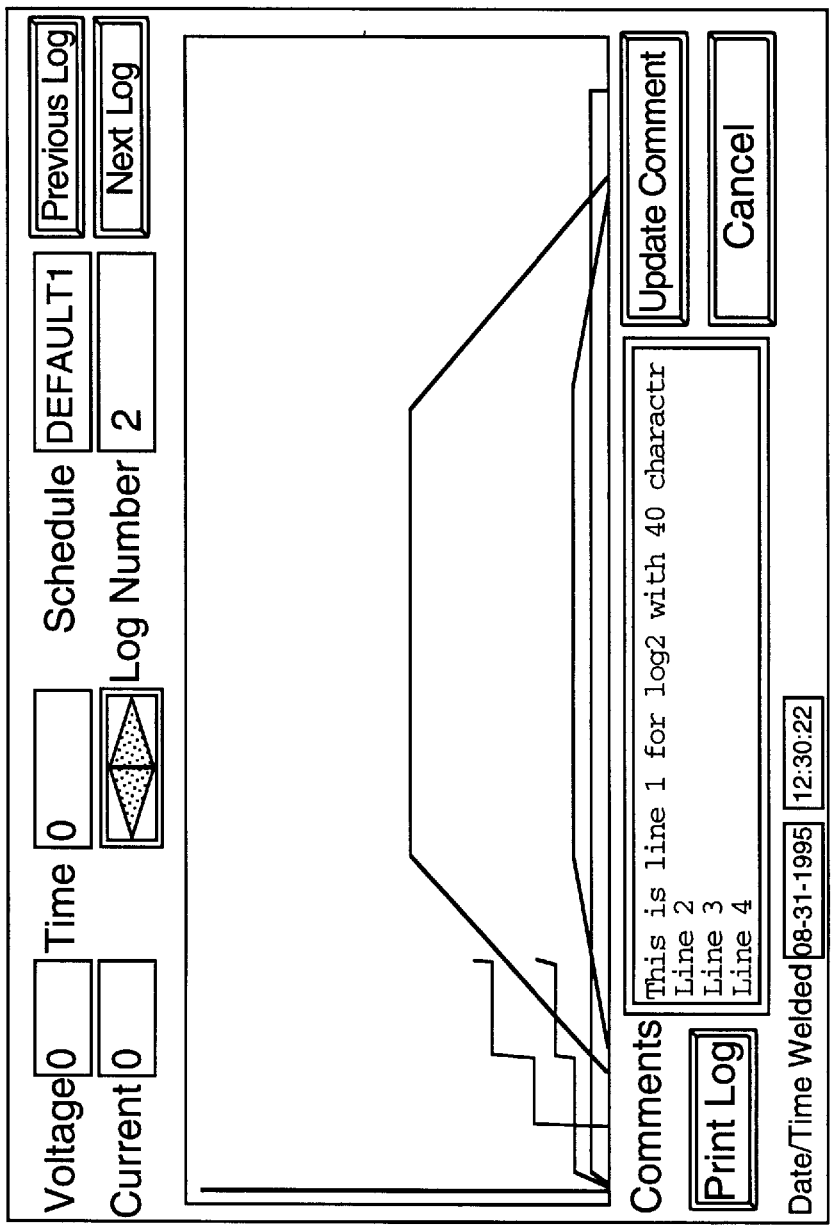

FIG. 2 is a block diagram that shows the functional capabilities of the present invention and the many possible connections to input, storage and peripheral devices 700. In one embodiment of the invention, the Computer Control Module 400 includes a ports for a PCMCIA connector 702, a keyboard 704, a pointing device or mouse 706, an external monitor 708 and a printer 710. FIG. 3 provides an additional block diagram which shows connections between an embodiment of the present invention and external devices.

FIGS. 4 through 9 are reproductions of photographs of the output of the LCD with a touch screen. This sequence of drawings illustrates the easy-to-use computer program which provides precise and automatic control of the present invention.

Computer Control Module 400

Figure 10:
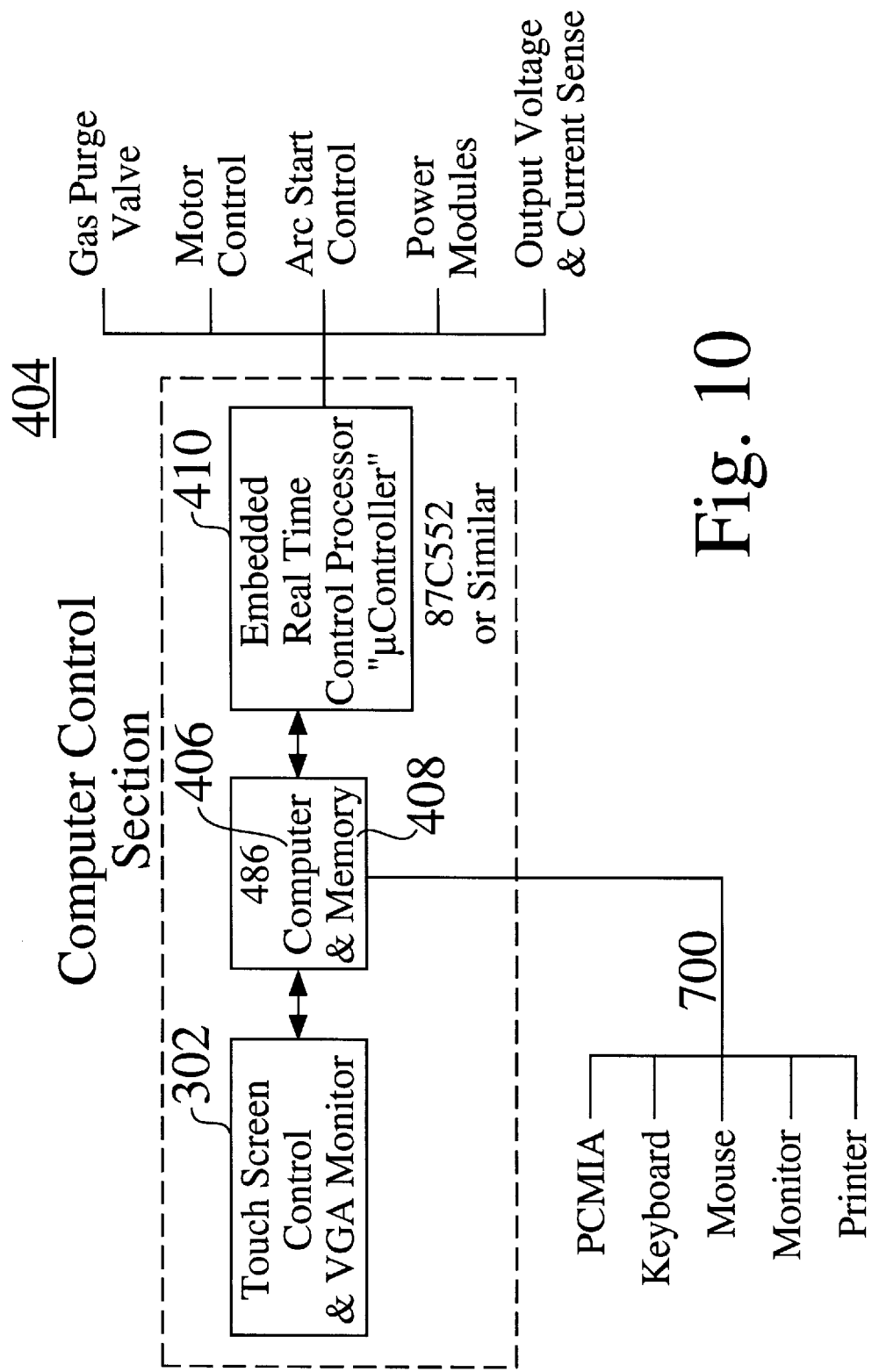
FIGS. 10, 11 and 12 furnish schematic diagrams of the electronic components of a preferred embodiment of the present invention.
Figure 11:
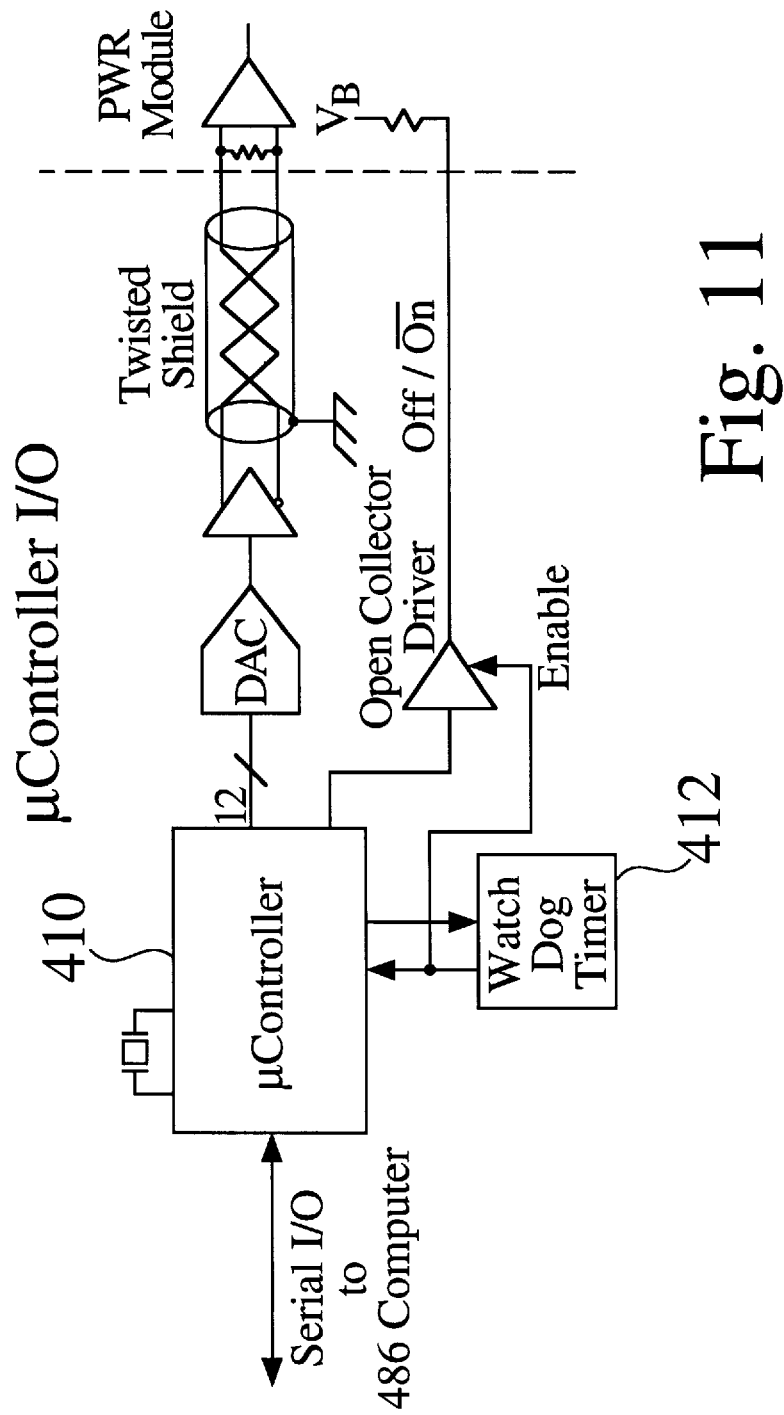
Figure 12:
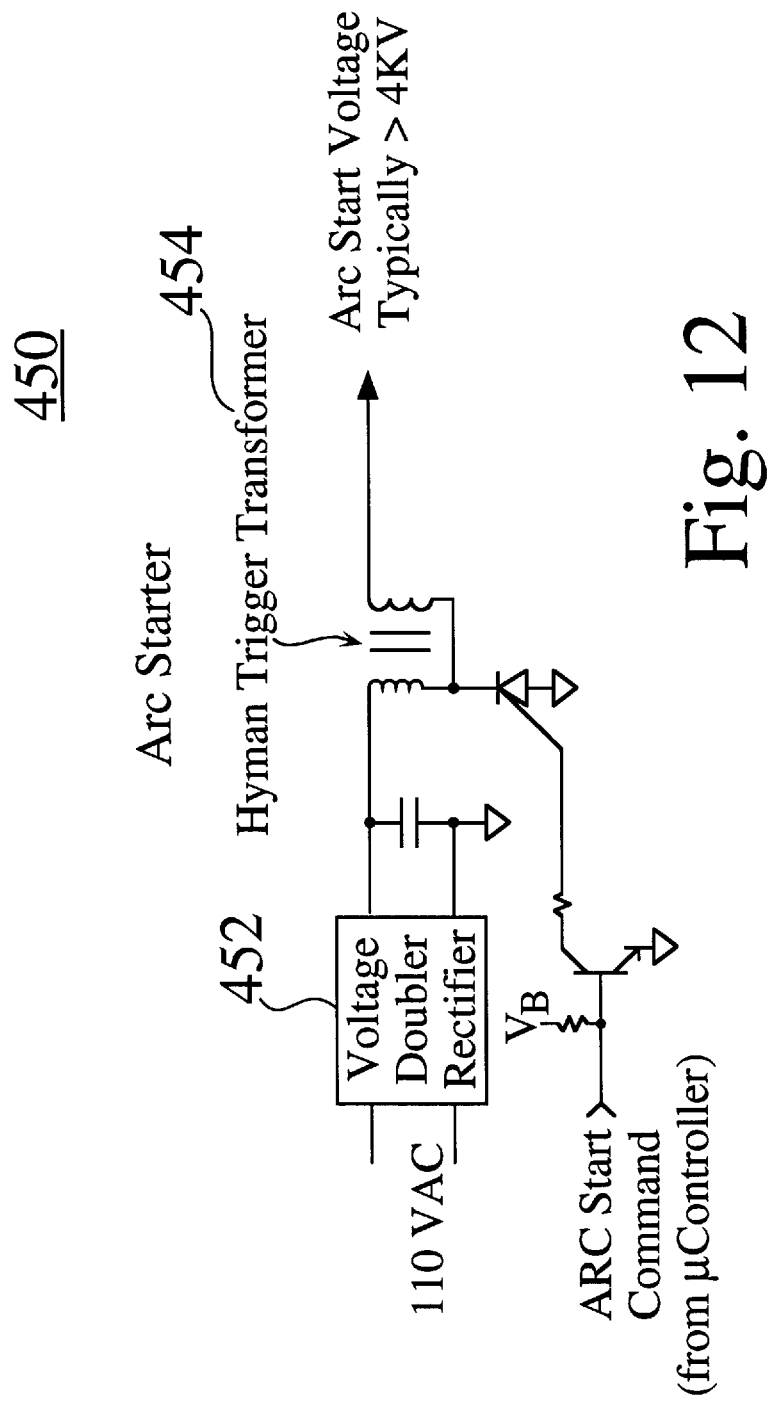

FIG. 10 is a schematic diagram which shows the circuitry within the Computer Control Module 400. FIGS. 11 and 12 provide schematic illustrations of the Microcontroller and Arc Starter circuits. The computer control circuits incorporate concurrent processing architecture and includes a micro-processor 406, a non-volatile memory 408 and an embedded real time control processor. The microprocessor 406 controls and monitors the function of the Welding Power Module 500. The Computer Control Module controls each module individually or in unison. In one embodiment of the invention, an 80486 chip is employed to produce a graphic user interface that is generated on the display 300. Proprietary software developed by Creative Pathways™, Inc. of Torrance, Calif. creates an extremely user-friendly environment using the Microsoft™ Windows™ Operating System. Unlike some previous power supplies, the display is integrated into the Power Supply.

The Computer Control Module performs data logging, generates reports and stores and displays welding parameter and welding power calibration entries. Calibration data may be entered using the touch screen display 300. The microprocessor then stores the calibration points in a non-volatile memory. These data points are then used during all subsequent welds. The processor monitors the weld data, and checks it against the stored calibration data. A report may be generated at the end of weld operation, which would report any errors that occurred during the sequence.

Welding Power Module 500

The Welding Power Module is capable of operating one, two or more welding arcs simultaneously.

Electrical Power Module 600

The Electrical Power Module 600 includes an on/off switch, an EMI filter, a motor control and provides circuitry for housekeeping and management functions. This module uses advanced switching mode current source supply technology. The system may operate at close to a 100% duty cycle at full load.

Applications in Cleanroom & Aerospace Environments

The preferred and alternative embodiments of the present invention may be fabricated for bench-top operation, for use in a lightweight portable scaffold, as part of a cleanroom installation or as part of the specialized equipment that will be employed on the International Space Station.

The invention may be used as a stand-alone unit or may be used in combination with remote control equipment. The PCMCIA cards may be transported back and forth between welding stations, quality control and inspection sites and engineering and staff meetings where the recorded data can be printed out and analyzed.

Operation of the Power Supply

One embodiment of the invention is specifically designed to be used for welding stainless steel and titanium tubes. The welding process begins with a burst of high voltage energy to start the arc after the purge gas has been turned on. This energy travels down the welding cables through the weld head and across the gap between the electrode and the tube. At the same time, arc start energy radiates off the welding cables and the weld head. This energy is called electromagnetic interference or "EMI noise". In the present invention, the EMI noise is minimized by the following features:

1. Careful isolation of each power converter, i.e., computer power supply, arc starter, power module, etc.;
2. Proper single point grounding and tight EMI shielding of the entire box;
3. Shielded weld cables;
4. Regulating the amount of energy used for the Arc Start; and
5. Separate shielded compartment for the 486 computer and embedded real time control processor.

The individual power units in drawers 504 are programmed to begin delivering current to the weld work piece as soon as the Arc Start voltage ionizes the local atmosphere. When the Arc Start initiates the welding sequence, the power module output voltage drops to a typical voltage of approximately 12 VDC. The current is then regulated as previously programmed using the touch screen display 300. The computer 400 can energize the drawer 504 at random and can sequence among them as required by the needs of a particular welding task.

In addition to the power module control, the embedded control processor 410 regulates the operation of the motor. This control includes speed, ramp speed up and down and home speed.

As is best seen in FIG. 10, the operator has several ways to control the welding sequence. The primary interface is the touch screen display 300. The touch screen display overlays a VGA color monitor. The 486 computer weld software runs within the Microsoft™ Windows™ Operating System. This provides the user with a familiar operating system, and minimizes training.

The keyboard 704 and mouse or pointing device 706 provide alternative interfaces to the welding equipment, thereby bypassing the touch screen 300. The printer 710 enables the operator to print for record keeping any of the weld schedules.

In a preferred embodiment of the invention, the embedded real time control processor 410 is a Philips 87C552 or similar micro controller. The 486 computer 406 sends user commands to the embedded controller 410 via a serial interface. The embedded controller then commands and regulates the internal operation of the weld sequence by controlling the following components and variables:

1. Gas Purge Solenoid Valve;
2. Motor Control;
3. Arc Starter;
4. Power Modules; and
5. Output Voltage and Current Sense.

FIG. 11 is a block diagram that depicts the inputs and outputs of the micro controller 410. This figure essentially shows how the micro controller is coupled to each of the power units in drawers 504. The DAC outputs a linear control voltage that determines how much current is supplied to the weld workpiece. The signal is interfaced differentially as well as shielded. The on/off control of the power units is an open collector gate than can be disabled by the watch dog timer. Primarily, the interface is designed for safety and noise. The watch dog timer 412 gets an interrupt from the micro controller each time the software routine is executed. If for some reason the software routine is not executed, i.e., the computer "hangs-up", the watch dog timer 412 initiates a reset to the processor and turns off the power modules, thus instantly returning the welder to a safe state.

FIG. 12 reveals the details of the novel Arc Starter Circuit 450. It works directly off a conventional 110 VAC power source. A voltage doubler and rectifier is connected directly to the 110 VAC input. A capacitor stores the electrical energy to be used as arc start energy. A silicon-controlled rectifier (SCR) becomes a short to ground when commanded by the micro controller. The charge stored on the capacitor dumps to ground through the transformer and SCR. This capacitor discharges with a current spike of approximately 30 amps. The Hyman Trigger transformer 454 then generates a high voltage greater than 4000 volts.

Welding Schedules & Input Parameters

Table One provides a typical set of current level data for a welding operation.

TABLE One

SET WELD SCHEDULE CURRENT
CREATIVE PATHWAYS

Micro-Impulsar 100

| Schedule Name: | Date: | Misc: |
|---|---|---|
| Boeing Duct Weld | 5/15/92 | 7' .035 Ti 24 1 PM |
| Impulse Current (0.0–100.0A) | | 75.0 |
| Impulse Start Level (2.0–100.0A) | | 20.0 |
| Maintenance Current (0.0–100.0A) | | 65.0 |
| Maint. Start Level (2.0–100.0A) | | 18.0 |
| Pulse Rate (0–100PPS) | | 75. |
| Duty Cycle (0–100%) | | 50. |

A brief explanation of the parameters contained in Table One follows.

IMPULSE CURRENT: (5 to 100 Amps) Arc Impulse Current. Impulse current can be thought of as the arc penetrating current. It is meant to penetrate through the tube and form the inner weld bead. The user may have to experiment with this setting by making a test weld, then sectioning the tube to examine the inner bead.

IMPULSE START LEVEL: (5.0 TO 100.0 Amps). The impulse current at the start of upslope. This would normally be about 10% of the impulse current or 5 Amps, whichever is greater. When upslope is not being used, set this value the same as the impulse current.

MAINTENANCE CURRENT: (3 to 100 Amps) Arc Maintaining Current. Maintenance current or background current is the current that maintains the arc and heat input between pulses.

MAINT START LEVEL: (3.0 to 100.0 Amps). Maintenance current level at the start of upslope. Normally 10% of the maintenance current level or 4 amps, whichever is greater. When upslope is not being used, set this value the same as the maintenance current.

PULSE RATE: (1 to 100 Hz) The number of times per second the current switches from impulse to maintenance. Set the frequency so that you can just notice each individual impulse overlap the preceding one when inspecting the weld. If the frequency is too high, the arc will wander and the edges of the weld will be rough and uneven. If the frequency is set too low, the weld will resemble individual overlapping spot welds.

DUTY CYCLE: (2 to 98%) The percentage of time the current is at the impulse level. This control allows a convenient method for making small adjustments in the weld schedule once it has been developed. To slightly increase penetration, increase duty cycle 1 or 2 percent; use the reverse to decrease penetration.

Table Two contains timing information for a welding sequence.

TABLE Two

SET WELD SCHEDULE TIMING
CREATIVE PATHWAYS

Micro-Impulsar 100

| Schedule Name: | Date: | Misc: |
|---|---|---|
| Boeing Duct Weld | 5/15/92 | 7", .035 Ti 26 1 PM |
| Pre-Purge time (1–100.0s) | | 4.0 |
| Upslope time (0–100s) | | 5.0 |
| Dwell (0.0–180.0s) | | 47.0 |
| Taper Down Interval (0.0–100.0s) | | 6.0 |
| Taper Down Percent (0–100%) | | 50 |
| Down Slope (0.0–100.0s) | | 4.0 |
| Post-Purge time (1–100S) | | 4.0 |

PRE-PURGE: (2 to 100 seconds): Set this control to allow enough time for the gas to displace all oxygen in the weld head, i.e. 25 to 40 seconds for CPI's smaller heads. For the duct welding system, this value should be at least 60 seconds.

UPSLOPE: (0 to 100 seconds). Impulse and maintenance current levels increase to the dwell levels.

DWELL: (1 to 180 seconds). During this time, the output current switches between the impulse and maintenance levels at the frequency and duty cycle entered. The dwell cycle forms the main body of the weld.

TAPER: (0 to 100 seconds). Impulse and maintenance current levels decrease linearly to a certain percentage of their initial value. Taper can be used as a second downslope cycle to slowly decrease the heat input before the current is finally downsloped to zero.

PERCENT TAPER: (0 to 100 percent). The percentage decrease in impulse and maintenance current at the end of the taper cycle.

DOWNSLOPE: (0 to 100 seconds). Impulse and maintenance current levels decrease uniformly to zero. The downslope cycle forms the end of the weld.

POST-PURGE: (1 to 100 seconds). Set this control for enough time to ensure that the weld does not oxidize or discolor after it is completed, i.e. 30 to 50 seconds for CPI's smaller heads, 60 seconds or more for a duct weld.

Table Three exhibits rotor control parameters.

TABLE Three

SET ROTOR CONTROL PARAMETERS
CREATIVE PATHWAYS

Micro-Impulsar 100

| Schedule Name: | Date: | Misc: |
|---|---|---|
| Boeing Duct Weld | 5/15/92 | 7" .035 Ti 24 1 PM |
| Rotor Delay time (0–10.0s) | | 1.0 |
| Rotor Weld Speed (0–100%) | | 13 |
| Rotor Start Speed (0–100%) | | 30 |
| Rotor Ramp Time (0.0–100.0s) | | 4.0 |
| Rotor Home Speed (0–100%) | | 100 |

ROTOR DELAY TIME: (0 to 10.0 seconds). Delay time from arc start to fixture drive enable. This time period may be used to delay the fixture drive for short periods in order that the arc can penetrate deep into the material being welded. Rotor delay is sometimes used with heavy wall tubing or large diameter thin wall ducting.

ROTOR WELD SPEED: (1 to 100 percent). Weld speed. This is the fixture speed that is used during the weld. Micro-Fit weld heads utilize an optical encoder feedback system for speed control accuracy of better than ¼ percent.

ROTOR START SPEED: (0 to 100 percent). This is the fixture speed at the start of the weld. The weld head will start at this speed and ramp up to the weld speed. If motor ramping is not being used, set the rotor start speed to the same value as the rotor weld speed.

ROTOR RAMPTIME: (0.0 to 100.0 seconds). This is the time that the weld head takes to ramp from start speed to weld speed. If motor ramping is not required, set this value to zero.

ROTOR HOME SPEED: (1 to 100 percent). Weld head jog and return to home speed. For welding, set this value to a fairly high number so the weld head will return to home quickly at the end of the weld. For jogging the weld head, set this value to a lower number.

The present invention uses weld heads which utilize optical sensors for both speed and position control. To further simplify the head design, there are actually two home positions.

Table Four reveals data concerning the arc starter.

TABLE Four

SET ARC STARTER PARAMETER
CREATIVE PATHWAYS

Micro-Impulsar 100

| Schedule Name: | Date: | Misc: |
|---|---|---|
| Boeing Duct Weld | 5/15/92 | 7" .035 Ti 24 1 PM |
| Arc Start Current (0.0–100.0A) | | 50.0 |
| Arc Start Duration (0.0–1.00S) | | 0.15 |

START CURRENT: (20 to 90 amps). This is the current that flows during the arc start cycle. A setting of 40 amps is optimal for most applications. Large diameter thin wall ducting requires around 50 amps.

START DURATION: (.02 to 0.99 seconds). The length of time that the start current flows. This control is used for setting arc start intensity. A setting of 0.15 seconds is a good starting point, although if you are welding small diameter thin wall tubing, a lower setting will be required.

CONCLUSION

Although the present invention was designed for use in the semiconductor fabrication and aerospace environments, the Computer-Controlled Modular Power Supply for Precision Welding may be employed in a great number of industrial settings. Although the present invention has been described in detail with reference to a particular preferred embodiment, persons possessing ordinary skill in the art to which this invention pertains will appreciate that various modifications and enhancements may be made without departing from the spirit and scope of the Claims that follow. The various components of the invention that have been disclosed above are intended to educate the reader about preferred embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

| LIST OF REFERENCE CHARACTERS | |
|---|---|
| 100 | Enclosure |
| 102 | Frame |

-continued

LIST OF REFERENCE CHARACTERS

| | |
|---|---|
| 104 | Frame |
| 106 | Interior of enclosure |
| 108 | Rails |
| 110 | Interior module bays |
| 200 | Front panel |
| 300 | Liquid crystal display with a touch screen |
| 400 | Computer Control Module |
| 402 | Computer peripheral port panel |
| 404 | Circuit diagram of Computer Control Module |
| 406 | 80486 Microprocessor |
| 408 | Non-volatile memory |
| 410 | Embedded real time control processor |
| 450 | Arc starter circuit |
| 452 | Voltage doubler and rectifier |
| 454 | Hyman Trigger Transformer |
| 500 | Welding Power Module |
| 502 | Drawer containing individual power unit |
| 504 | Heat dissipating fins |
| 600 | Electrical Power Module |
| 700 | Input, Monitoring, Storage & Peripheral Devices |
| 702 | PCMCIA |
| 704 | Keyboard |
| 706 | Mouse |
| 708 | Monitor |
| 710 | Printer |

What is claimed is:

1. An apparatus for providing electrical power comprising:
   an enclosure (100); said enclosure (100) having an interior (106);
   said interior (106) being partitioned into a plurality of bays (110);
   a Computer Control Module (400) which is inserted into one of said plurality of bays (110); said Computer Control Module (400) including a programmable micro-processor (406) and a non-volatile memory (408);
   a Welding Power Module (500) which is inserted into one of said plurality of bays (110); said Welding Power Module (500) including a plurality of drawers (504) containing individual power units; each of said drawers (502) having a plurality of heat-dissipating fins (504) for cooling said drawers (502) without vents or fans to keep said interior (106) free from outside contamination;
   an Electrical Power Module (600) which is inserted into one of said plurality of bays (110); and
   a display (300) mounted on said enclosure (100) for monitoring the operation of said Computer Control Module (400) and said Welding Power Module (500).

2. An apparatus as recited in claim 1, in which:
   each of said modules (400, 500, 600) may each separately be removed from said enclosure 100.

3. An apparatus as recited in claim 1, in which:
   each of said drawers (502) may each separately be removed from said Welding Power Module (500).

4. An apparatus as recited in claim 1, in which:
   each of said modules (400, 500, 600) may each be interchanged to provide a variety of said modules (400, 500, 600) within said enclosure (100).

5. An apparatus as recited in claim 1, in which:
   said display (300), which is located in said front panel (200) of said enclosure (100), is a liquid crystal display with a touch screen (300) that allows the operator of the Power Supply to monitor its functions.

6. An apparatus as recited in claim 1, in which:
   said Computer Control Module (400) is loaded with an operating system that includes a graphical user interface.

7. An apparatus as recited in claim 1, in which:
   said Computer Control Module (400) includes an embedded real-time processor (410) which controls said Welding Power Module (500).

8. An apparatus as recited in claim 1, in which:
   said Computer Control Module (400) includes a watch dog timer (412) to maintain safe welding operations by turning off said Power Module (500) if a software routine running in said Computer Control Module is not executed.

9. An apparatus as recited in claim 1, in which:
   said Computer Control Module (400) generates a graphical user interface on said display (300) that allows the operator of the Power Supply to monitor its functions.

10. An apparatus as recited in claim 1, in which:
    said Computer Control Module (400) stores calibration points in said non-volatile memory after said calibration points are entered on said display (300); said calibration points being used to compare stored data concerning welding cycles to actual measurements to verify the quality of welding operations.

11. An apparatus as recited in claim 1, in which:
    said Welding Power Module (500) operates more than one welding arc simultaneously by drawing separately controllable electrical currents from said drawers (502).

12. An apparatus as recited in claim 1, in which:
    said Welding Power Module (500) is used for multi-axes welding by using separately controllable electrical currents from said drawers (502).

13. An apparatus as recited in claim 1, in which:
    said Electrical Power (600) includes a low emission Arc Starter Circuit (450) which discharges a large spike of current to initiate an arc.

14. An apparatus as recited in claim 13, in which:
    said Arc Starter Circuit (450) includes a voltage double and rectifier (452) and a Hyman Trigger transformer (454);
    said voltage double and rectifier (452) and a Hyman Trigger transformer (454) being coupled together to generate a high voltage in excess of 4,000 volts.

15. An apparatus as recited in claim 1, in which:
    said Welding Power Module (500) is connected to an induction heater and is used for induction heating tasks.

16. An apparatus as recited in claim 1, in which:
    said Computer Control Module (400) is connected to a CNC system and is used to control CNC operations.

17. An apparatus as recited in claim 1, in which:
    said Computer Control Module (400) is connected to an X–Y table and is used to control an X–Y table.

18. An apparatus as recited in claim 1, in which:
    said Computer Control Module (400) is connected to an induction heater and is used to control induction heating.

\* \* \* \* \*